US011350010B2

(12) United States Patent
Vangheluwe et al.

(10) Patent No.: US 11,350,010 B2
(45) Date of Patent: May 31, 2022

(54) METHOD FOR BUILDING A SECURITY IMAGE BY MULTIPLEXING COLOR IMAGES

(71) Applicants: HID Global CID SAS, Suresnes (FR); UNIVERSITÉ JEAN MONNET SAINT ETIENNE, Saint Etienne (FR); CENTRE NATIONAL DE LA RECHERCHE SCIENTIFIQUE, Paris (FR)

(72) Inventors: Marie Vangheluwe, Le Cannet (FR); Alice Vermeulin, Paris (FR); Nathalie Destouches, Saint-Etienne (FR); Mathieu Hébert, Lyons (FR)

(73) Assignees: HID GLOBAL CID SAS, Suresnes (FR); CENTRE NATIONAL DE LA RECHERCHE SCIENTIFIQUE, Paris (FR); UNIVERSITÉ JEAN MONNET SAINT ETIENNE, Saint Etienne (FR)

( * ) Notice: Subject to any disclaimer, the term of this patent is extended or adjusted under 35 U.S.C. 154(b) by 0 days.

(21) Appl. No.: 16/978,429

(22) PCT Filed: Mar. 5, 2019

(86) PCT No.: PCT/EP2019/055455
§ 371 (c)(1),
(2) Date: Sep. 4, 2020

(87) PCT Pub. No.: WO2019/170679
PCT Pub. Date: Sep. 12, 2019

(65) Prior Publication Data
US 2021/0039422 A1 Feb. 11, 2021

(30) Foreign Application Priority Data
Mar. 5, 2018 (FR) ...................................... 1851892

(51) Int. Cl.
*H04N 1/32* (2006.01)
*B41M 3/14* (2006.01)
(Continued)

(52) U.S. Cl.
CPC .......... *H04N 1/32144* (2013.01); *B41M 3/14* (2013.01); *B41M 3/148* (2013.01);
(Continued)

(58) Field of Classification Search
CPC combination set(s) only.
See application file for complete search history.

(56) References Cited

U.S. PATENT DOCUMENTS 5,692,226 A 11/1997 Hall
9,876,931 B2 * 1/2018 Pjanic ..................... H04N 1/52
(Continued)

FOREIGN PATENT DOCUMENTS

| EP | 2588992 B1 * | 2/2017 | ............. G07D 7/121 |
| FR | 2921012 A1 | 3/2009 | |
| FR | 2997964 A1 | 5/2014 | |

OTHER PUBLICATIONS

"International Application Serial No. PCT/EP2019/055455, International Search Report dated Jun. 14, 2020", 2 pgs.
(Continued)

*Primary Examiner* — Barbara D Reinier
(74) *Attorney, Agent, or Firm* — Schwegman Lundberg & Woessner, P.A.

(57) ABSTRACT

A method for building a security image for a security structure of a security document from multiplexing color images, including selecting a marking method capable of producing sets of colors on the security document comprising different colors that can be displayed according to illumination/observation modes of the security structure, establishing a plurality of color sets that can be displayed by
(Continued)

the security structure in a plurality of the different illumination/observation modes, distributing the color sets in a plurality of groups of color sets, establishing combinations of groups of color sets having at least one color set in common across the number of different illumination/observation modes, selecting a combination of a group of color sets based on the number of desired illumination/observation modes and the number of colors per color image, and determining the color images to multiplex by means of the combination of the group of color sets selected.

20 Claims, 2 Drawing Sheets

(51) Int. Cl.
*H04N 1/60* (2006.01)
*G06K 15/02* (2006.01)
*G06K 15/12* (2006.01)

(52) U.S. Cl.
CPC ....... *H04N 1/32309* (2013.01); *H04N 1/6058* (2013.01); *H04N 1/6086* (2013.01); *H04N 1/6088* (2013.01); *H04N 1/6097* (2013.01); *G06K 15/027* (2013.01); *G06K 15/129* (2013.01)

(56) References Cited

U.S. PATENT DOCUMENTS 10,491,784 B2 11/2019 Pjanic et al.
10,787,020 B2* 9/2020 Berthe .................. G07D 7/003

OTHER PUBLICATIONS

"European Application Serial No. 19708853.7, Response to Communication pursuant to Rules 161(1) and 162 EPC filed Jan. 28, 2021", 14 pgs.

* cited by examiner

METHOD FOR BUILDING A SECURITY IMAGE BY MULTIPLEXING COLOR IMAGES

The present application is a national stage application under 35 U.S.C. § 371 of PCT Application No. PCT/EP2019/055455, filed Mar. 5, 2019, which claims the benefit of French Patent Application No. 1851892, filed Mar. 5, 2018, each of which is hereby incorporated herein by reference in its entirety.

The invention relates to security structures used to secure various documents against falsification and counterfeiting attempts, and also the security structures used to identify and authenticate different documents, and the security elements incorporating such structures, said security elements being intended to be incorporated in documents, and the actual documents thus secured.

The invention relates more particularly to a method for multiplexing color images.

Multiplexing refers to the combining of a plurality of images in the same area so as to be able to display different color images alternately in said area according to the illumination and observation conditions in said area. Such images may be produced by marking, deposition or printing techniques that allow supports to be colored by providing the particular property of appearing under different colors according to the illumination and observation conditions used to observe them, and at each point thereon. The images are composed of different areas inscribed by the marking, deposition or printing techniques and particular areas, known as "homogeneous areas," and are therefore characterized not by a single color but by a set of colors. Said colors are measured in each of the selected illumination and observation modes.

Storing 3D data by modifying a matrix of phosphate glass doped with silver ions under a femtosecond laser has already been proposed. The images are engraved in planes superimposed on the sample and coded as gray levels. The gray scale is obtained by modifying the fluorescence intensity of the clusters of silver generated not laser interaction. However, the images displayed are not in color and can only be observed by fluorescence microscopy. Moreover, the images are in different planes, not in the same plane.

Also known is a method of storing data by modifying gold nanorods by femtosecond laser allowing pseudo-holographic images to be obtained that are visible from different angles (EP 1 949 185). Images are recorded in different planes, but six different images may be encoded within each plane. To display one of the six images encoded in a plane, a given pair {wavelength, polarization} is used. However, said images can be observed by excitation fluorescence microscopy, are basically binary (black+one color) and are necessarily the color of the wavelength used (no real multicolor information).

Also known are various methods, such as printing on a metal support, CLI/MLI (Changeable Laser Image and Multiple Laser Image) methods, or alternatively holography allowing a plurality of different images to be displayed according to the illumination and observation conditions. However, the number of images is often limited to two, and these are black and white images for CLI/MLI techniques, or very highly correlated images when printed on a metal support. Furthermore, said methods usually require either a spatial filtering system such as a network of lenses used for CLI/MLI methods (in which case the images are intertwined), or the structure of the support is modified, for example by embossing in the case of holographic methods.

Finally, security elements that are sensitive to light polarization allow a plurality of images to be displayed according to the illumination and observation conditions. However, the number of images and colors is limited, and the images can usually only be observed using two types of polarization, two angles of observation or two different infrared and ultraviolet wavelengths, respectively.

An object of the invention is to overcome the above-mentioned drawbacks by providing a method that allows a larger number of images that can be displayed to be obtained, images which are in color and noticeably different, or even completely different from one another.

The object of the invention is a method of building at least one security image for a security structure of a security document produced by multiplexing color images, the method comprising the following steps:
- selecting a marking method capable of producing sets of colors on the security document comprising different colors that can be displayed according to the modes of illumination and observation of the security structure, then, for example by means of a calculator,
- establishing a plurality of color sets by physical measurement that can be displayed by the security structure in different illumination and observation modes,
- distributing sets of colors comprising the different colors produced by the marking technique in a plurality of groups of color sets, said different colors being measured,
- establishing combinations of groups of color sets having at least one color set in common according to the number of different illumination and observation modes and the number of colors per image,
- selecting (12) a combination of a group of color sets according to the number of desired illumination and observation modes and the number of colors per image, and
- determining the images to multiplex by means of the combination of the group of color sets selected.

Thus, the method according to the invention allows the number of images that can be displayed in the same security structure to be optimized, by determining a set of combinations of groups of color sets that can be used according to the number of images to multiplex and the number of colors desired per images. It is therefore possible to obtain and to display a particular number of different images in important colors, which images comprise colors that allow them to be easily differentiated from one another. In other words, the method according to the invention allows the number of images that can be displayed to be maximized, from a given number of color sets.

The method according to the invention may comprise one or more of the following characteristics:
- the step of determining the images to multiplex by combining the selected group of color sets comprises steps of building a table of color sets based on the selected combination of the group of color sets, determining the images to multiplex based on the table of color sets and producing multiplexed images by means of the table of color sets;
- a display of the different multiplexed images is independent of any spatial filtering system, and the resolution of the images observed is the same as that for marking, deposition or printing;
- the step of distributing color sets comprises at least one of the following steps:
    - determining the color sets comprising the colors that can be observed in the same illumination and observation modes for which the difference therebetween is below a given threshold, creating new color sets, and determining color sets that comprise colors that are identical in the same illumination and observation modes.

the step of determining the color sets that comprise the colors that can be observed in the same illumination and observation modes for which the difference therebetween is below a given threshold comprises repeating the following steps:

determining a reference color present in a first color set and in a given illumination and observation mode, comparing the reference color to a second color from a second color set, where the second color can be observed in the same illumination and observation mode as the reference color, and adding the second color to the color set associated with the reference color for the selected illumination and observation mode if the difference between the two colors is below the given threshold;

the method comprises, after the step of distributing color sets into groups of color sets, a step of selecting groups of color sets that, in each illumination and observation mode, do not comprise any common color set;

the step of selecting groups of color sets is carried out by iteration of the following steps:

selecting the group of color sets having the largest number of color sets for each illumination and observation mode, and eliminating all the groups of color sets having color sets that are already present in the group having the largest number of color sets.

If groups of color sets of the same size are present when making the selection, the method is applied to each group of color sets increasing tenfold whenever necessary, which will lead to a plurality of different selections of groups of color sets being produced.

the step of establishing combinations of groups of color sets having at least one color set in common is carried out for each selection of a group of color sets selected through all the illumination and observation modes;

the step of establishing a combination of groups of color sets having at least one color set in common comprises the following steps:

determining all the existing combinations of groups of color sets among the groups of color sets resulting from all the possible selections of groups of color sets, and eliminating, for each illumination and observation mode, combinations of groups of color sets that involve a number of color sets that is strictly less than $\Pi_{q=1:K-1}C_q$, $C_q$ being the number of groups of color sets for an illumination and observation mode q, K−1 being the complete set of illumination and observation modes except for the illumination and observation mode in question;

the method comprises, for all the combinations of groups of color sets involving a number of color sets strictly greater than $\Pi_{q=1:K-1}C_q$, the following steps:

searching for sub-groups of color sets belonging to the same group of color sets in each illumination and observation mode, selecting a sub-group, preferably the one with the lowest average color difference from the reference color for each illumination and observation mode, and saving the other sub-groups of color sets.

the marking technique is the laser structuring of a layer containing metal nanoparticles.

The invention also relates to a method of marking a security structure, in which a marking method is used that is suitable for displaying different colors on the security structure according to the different illumination and observation modes of the security structure, the marking method comprising, prior to a step of marking the security structure, a building method according to the invention.

According to the invention, a computer program is also provided comprising instructions suitable for controlling the execution of the method according to the invention when executed on a computer.

Also according to the invention, a method is provided for making said program according to the invention available for downloading from a telecommunications network.

Also according to the invention, a computer-readable recoding support is provided on which a computer program comprising program code instructions for executing the steps of the method according to the invention is recorded.

The invention also relates to a security structure produced by a marking method according to the invention.

The invention also relates to a secured article comprising a security structure according to the preceding paragraph, in particular a security element or a secured document such as, a passport, identity card, driving license, personal identification document, access document or card, interactive playing or trading card, payment means, in particular a payment card, bank note, gift coupon or voucher, secured label, travel card, loyalty card, service provision card or membership card.

Figure 1:
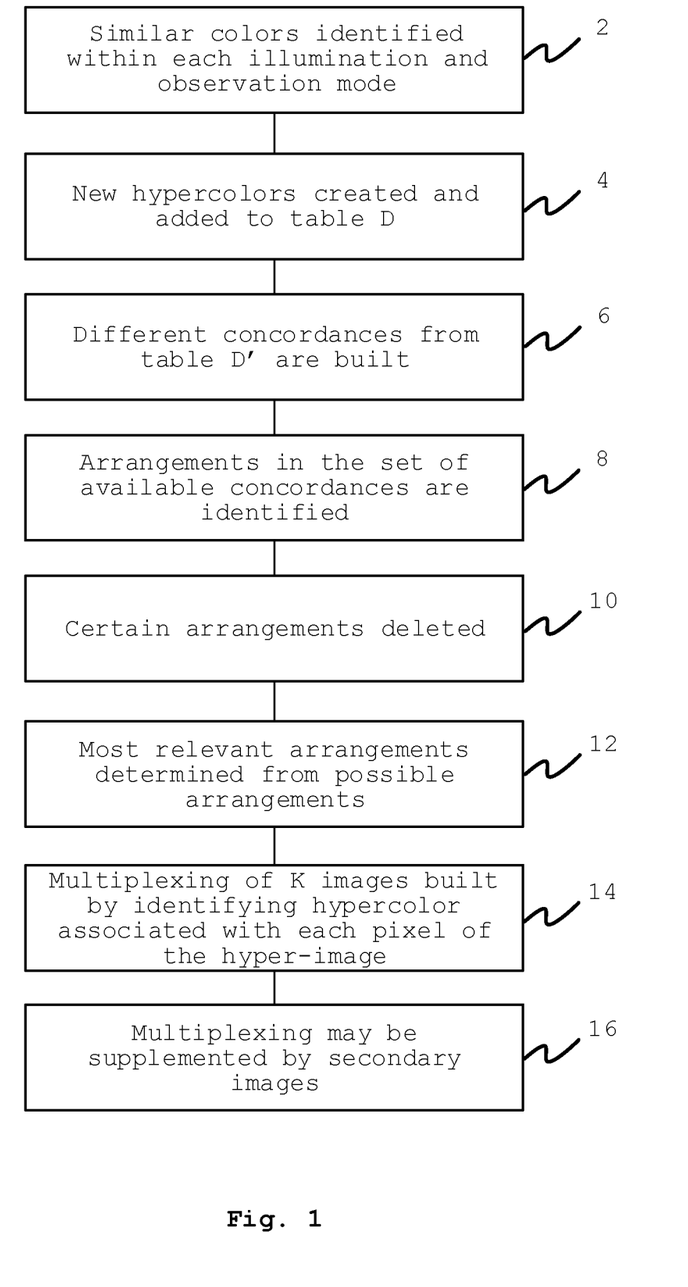
FIG. 1 is a flowchart of the steps of the method of building a security image according to the invention.

An embodiment of the invention will now be presented, given as a non-limiting example and supported by the accompanying drawings in which:

FIG. 1 is a flowchart of the method of building a security image according to the invention.

As explained earlier, image multiplexing means the way in which color sets can be selected and combined spatially on a support produced by a marking, deposition or printing technology chosen so that the marked or printed area of the support displays different images in the same place by observing said image in different illumination and observation modes (or conditions). Different images encoded on the support may also be displayed by projecting the surface of the support onto screens, the projection conditions used therefore counting among the possible illumination and observation modes.

An illumination and observation mode is defined by various optogeometric parameters which characterize the illumination and observation conditions of the support. The parameters that characterize the illumination are basically the spectrum of the light source, the divergence of the source, its angle of incidence or position relative to the sample, and its polarization. The observation parameters are basically the spectral response of the detector (the detector may be the human visual system or a physical detector), the angle of observation or its position relative to the sample, and the polarization of the light allowed to enter the detector.

The following illumination and observation modes may be given as an example:
   mode 1: observation in transmission with a white non-polarized light,
   mode 2: observation in specular reflection with a white non-polarized light,
   mode 3: observation in transmission with a white linearly polarized light.

"Hypercolor" means a color set characterizing an area of the security structure, said area being suitable for displaying a different color from among said color set according to the illumination and observation conditions (or modes). The term hypercolor will be used hereinafter to describe this color set. The hypercolor is "arranged' on the security structure in an area marked by the marking method and the hypercolor in this area is chosen to display different colors in each of the illumination and observation conditions envisaged.

A multiplexed image is a series of images that can be observed successively in the same area of a support if the illumination and observation modes are changed. The image encoded from these multiplexed images is marked, deposited or printed on the support, for example, point by point. Each point contains a hypercolor that changes color according to the illumination and observation mode under consideration. The way the images are displayed in different illumination and observation conditions may take the form of any spatial filtering system such as, for example, a network of lenses used in CLI/MLI (Changeable Laser Image and Multiple Laser Image) methods, and may also take the form of any modification of the support such as, for example, embossing for a holographic method. The resolution of the images observed may therefore be the same as that for marking, deposition or printing.

These hypercolors and illumination and observation modes, which modes may be described as "useful modes," may be used to:
   display images that are completely different from one another in different illumination and observation modes; in this case, the term "primary," or "independent" is used to describe hypercolors and illumination and observation modes;
   display different but non-independent images (having a common portion), in different illumination and observation modes. This entails adding information in an image that is already present in another illumination and observation mode. In this case, the term "secondary" is used to describe hypercolors and illumination and observation modes.

The invention describes a method used to identify, within the set of hypercolors produced by a marking, deposition or printing technique, and an optical measurement process, the hypercolors that have concordances (a concordance being a group of hypercolors having substantially the same color in a given illumination and observation mode), and the illumination and observation modes associated with these concordances, which may be used to produce multiplexed images.

The multiplexing method can be explained with a simple example of two hypercolors each comprising two colors. In this example, two illumination and observation modes are used, for example an observation in transmission in normal incidence using a white polarized light source (such as a laptop screen or other type of decoder). In mode 1, the polarization is 45° to the horizontal, and in mode two, said polarization is horizontal.

The first hypercolor displays the same color, for example blue, twice. The second hypercolor displays two different colors, for example the same blue as in the first hypercolor and a gray.

In the first illumination and observation mode, the first and second hypercolors display the same blue, but in the second illumination and observation mode, the first hypercolor displays the blue and the second the gray. In the second mode, it is therefore possible to display a gray motif on a blue background. To do this, it must be determined where on the support the areas comprising the first hypercolor and the areas comprising the second should be positioned. It is therefore sufficient to parameterize the marking device so that said marking device modifies the support such that it is suitable for displaying the colors as described earlier. In other words, some areas of the security structure will be suitable for displaying the two colors of the first hypercolor and other areas will be suitable for displaying the two colors of the second hypercolor. It is worth noting at this stage that two colors of two hypercolors that can be observed in the same illumination and observation conditions may be identical or concordant, in other words similar within a given tolerance (i.e. the difference between said colors is less than a threshold value).

First of all, the marking technique must be determined that will be used to produce a security structure comprising a multiplexed image determined according to the present method. As mentioned earlier, this method may be a marking, deposition or printing technology. For example, it may be a laser marking technique consisting of nanostructuring an $Ag:TiO_2$ nanocomposite film deposited on a glass substrate by scanning the surface with a slightly focused laser beam emitting in the visible spectrum (see FR 2 997 964 in the name of the applicant). Controlling the laser irradiation conditions allows unique nanostructures to be generated characterized by various properties such as the size distribution of the metal nanoparticles, the degree of organization of the nanoparticles, the average period of the nanoparticle network (if there is one), the thickness of the film containing the nanoparticles, its nature and density, and the position of the nanoparticles in said film. The parameters of these nanostructures are controlled by a laser writing parameter set which contains the wavelength, peak power, pulse duration, repetition rate, beam size on the sample, polarization state of the incident beam and its orientation, writing speed (or number of accumulated pulses per line), and overlap rate between lines. For a given set of laser parameters, the properties of the nanostructures produced also depend on the initial properties of the film and of the support. By varying particular writing parameters such as the scanning speed, light intensity or laser polarization, it is possible to mark different areas of the film so that said areas have the property of displaying different hypercolors, in other words, different colors according to the illumination and observation modes chosen. The method according to the invention will be described taking this marking method as an example.

Alternatively, according to the invention the marking technique used may also consist of marking not on the surface but in the mass of the material.

The marking technique chosen allows a known number of hypercolors to be produced comprising the colors that can be observed in a number of illumination and observation modes, which is also known.

The method of selecting hypercolors and useful modes for multiplexing color images starts from the principle that a set $\Pi = \{p_z\}$ of hypercolors $p_z$ is available which has been measured in M different illumination and observation modes. The hypercolor $p_z$ corresponds to the color set $c_{zm}$ measured in the m illumination and observation modes chosen by the user.

Each color $c_{zm}$ is characterized by its colorimetric coordinates in a chosen space, for example the values [R G B] given by a detection system. The set of measured hypercolors is digitized and arranged in the form of a color table D in which each color is characterized by its colorimetric coordinates. Each row of the table corresponds to a hypercolor, and each column to an illumination and observation mode. The table contains the colors $c_{zm}$.

Among the colors measured, some may be used to carry out the color image multiplexing. The first part of the method aims to find independent (or primary) hypercolors and illumination and observation modes in table D, in other words, that can be used for multiplexing different color images.

First, colors that may be considered similar and that will be grouped into what is known as a concordance (or group of color sets) (step 2 in FIG. 1), must be identified within each illumination and observation mode.

A concordance is characterized by a color c and contains the hypercolors $p_z$ having the color in the illumination and observation mode m under consideration that is equal to c to within a given tolerance t. The corresponding concordance is referred to as $\Psi_{c,m}$.

Two colors $c_1$ and $c_2$ are considered concordant if the difference between the two colors is less than the given tolerance t.

If the colors are shown in a uniform colorimetric space, such as the CIE 1976 L*a*b color space, the tolerance t may preferably be expressed by a colorimetric metric such as $\Delta E^*ab$, CIE 1994 DeltaE or CIE DE2000.

The definition of CIE 1976 has been extended to correct non-uniformities of perception by the human eye by introducing weighting factors. The 1994 and 2000 formulas have succeeded that of 1976. $\Delta E^*_{94}$ is defined in particular in the L*C*h* space using lightness L*, chroma C* and hue h* differences calculated from L*a*b* colorimetric data. Given a color 1 ($L^*_1, a^*_1, b^*_1$) and another color 2 ($L^*_2, a^*_2, b^*_2$), the color difference is calculated as follows:

$$\Delta E^*_{94} = \sqrt{\left(\frac{\Delta L^*}{k_L S_L}\right)^2 + \left(\frac{\Delta C^*_{ab}}{k_C S_C}\right)^2 + \left(\frac{\Delta H^*_{ab}}{k_H S_H}\right)^2} \text{ with } \Delta L^* = L^*_1 - L^*_2$$

$$C^*_1 = \sqrt{a^{*2}_1 + b^{*2}_1} \text{ and } C^*_2 = \sqrt{a^{*2}_2 + b^{*2}_2}$$

$$\Delta C^*_{ab} = C^*_1 - C^*_2$$

$$\text{And } \Delta H^*_{ab} = \sqrt{\Delta E^{*2}_{ab} - \Delta L^{*2} - \Delta C^{*2}_{ab}} = \sqrt{\Delta a^{*2} + \Delta b^{*2} - \Delta C^{*2}_{ab}}$$

$$\text{with } \Delta a^* = a^*_1 - a^*_2, \Delta b^* = b^*_1 - b^*_2$$

$$S_L = 1, S_C = 1 + K_1 C^*_1, S_H = 1 + K_2 C^*_1$$

$k_C$ and $k_H$ being generally equal to 1; $k_L$, $K_1$ and $K_2$ depend on the application.

$k_L=1$, $K_1=0.045$ and $K_2=0.015$ for the graphic arts.

$\Delta E$ ($\Delta E=1$) expresses the smallest difference between two colors perceived by the human eye.

If the colors correspond to the RGB values captured by a color imagery system, the tolerance t can be expressed by a maximum difference between the values in each of the channels:

$$\begin{cases} |R_1 - R_2| < t \\ |G_1 - G_2| < t \\ |B_1 - B_2| < t \end{cases}$$

with $R_1$, $G_1$ and $B_1$ corresponding to the values of $c_1$ and $R_2$, $G_2$ and $B_2$ corresponding to the values of $c_2$.

The tolerance may also be defined according to the colors under consideration by parametric functions, to distinguish, for example, cases where the colors are light or dark:

$$\begin{cases} |R_1 - R_2| < t_R(R_1) \\ |G_1 - G_2| < t_G(G_1) \\ |B_1 - B_2| < t_B(B_1) \end{cases}$$

where $t_R$, $t_G$ and $t_B$ are continuous functions.

24-bit RGB colors are defined by 256 shades of red, green and blue, giving a total of $2^{24}$ or $256^3$ colors. The RGB values may vary between 0 and 255 for example, as may t.

In practice, colors that meet the similarity condition according to one of the above criteria are rarely strictly identical. It is therefore possible, from colors that meet this similarity condition, to create new hypercolors that are added to the initial table D in the form of new rows. To do this, iteration is carried out as described below (step 4 of FIG. 1).

For each of the illumination and observation modes m, each color $c_{zm}$ that can be displayed in this mode is taken successively as a reference and compared to all the other colors in the mode (present in the other hypercolors). If a color $c_{z'm}$ is declared similar to the reference color $c_{zm}$, a new "fictitious" hypercolor may be associated with the original hypercolor $p_{z'}$ may be added to the matrix D and created from the colors of the hypercolor $p_{z'}$ in all the illumination and observation modes except for the illumination and observation mode m where the color is established as equal to the reference color $c_{zm}$. The new hypercolors produced may be added to the bottom of the initial table in the form of additional rows may be used as new reference colors when searching for identical colors for the subsequent illumination and observation modes.

If the color $c_{z'm}$ used above is taken as a reference in a subsequent iteration of the loop in the same mode m, it will be identified as being similar to the color $c_{z''m}$ and this time a new fictitious hypercolor associated with the original hypercolor $p_z$ may be added to the table D. The same hypercolor may give rise to a plurality of new hypercolors if the colors within a mode vary by color variations that are less than the chosen tolerance.

A new color table D' may thus be generated comprising a number of rows that is greater than or equal to that of table D. The new hypercolors generated are still associated with the initial hypercolors that gave rise thereto.

The different concordances $\Psi_{c,m}$ resulting from the data table D' are built by combining the hypercolors $p_z$ that have exactly the same color c within mode m. In this case a tolerance of t=0 is applied (step 6 of FIG. 1).

Next, all the fictitious hypercolors are replaced by the associated original hypercolor in the concordances created. The color of the concordance is that of the color that was taken as a reference to generate all the fictitious hypercolors of the concordance.

The concordances used subsequently contain only original hypercolors, as opposed to fictitious hypercolors. An original hypercolor may belong to a plurality of concordances. The number of concordances in each of the illumination and observation modes is equal to the number of original colors that can be displayed in this mode, unless some of the original colors were strictly identical (in other words identical with a tolerance of t=0). Each concordance is a color that can be incorporated in the image to be displayed in the illumination and observation modes under consideration.

Concordances may also be created by c-mean or k-mean clustering techniques that are already coded into Matlab-type applications. These methods will not necessarily give the same concordances as the above-mentioned method for a given set of hypercolors.

Once the different concordances (or groups of hypercolors) have been obtained, it is possible to search for concordances that have, transversely to all the illumination and observation modes, at least one common hypercolor. These combinations are known as arrangements.

An independent arrangement will be named $A_K$, in other words a combination of concordances $\Psi_{c,m}$ such that the product of the numbers of concordances $|A_K|_q$ in each of the modes q under consideration is equal to the number of useful hypercolors $\mathcal{N}_{\mathcal{A}_K}$ present in the concordances $\mathcal{N}_{\mathcal{A}_K} = \Pi_{q=1:K|A_K|q}$. To define an independent arrangement, the following parameters will be considered: K images are to be multiplexed (K≤M), in other words K illumination and observation modes are to be used from the M available, where each image contains $C_q$ colors, where 1≤q≤K and where $C_q$ is less than or equal to the number of concordances in the illumination and observation mode q.

Independent arrangements allow images to be multiplexed that are independent of one another, in other words, images in which the colored motifs or areas are not spatially correlated with those of the other images.

The aim is to identify all the possible primary arrangements in the set of available concordances in the modes.

The process is carried out by iteration in order to:
select all the possible sets of K illumination and observation modes from M, for all the K that vary from M by 2;
select, in a given set of K illumination and observation modes, all the possible sets of number $C_q$ of desired concordances for each illumination and observation mode (desired number of colors per mode) for 1≤q≤K and where $C_q$ is ≤ the number of concordances in mode q;
write, for each given set of K illumination and observation modes from the M available, and each given set of concordances per illumination and observation mode from those available, all the possible arrangements from the arrangements found (step 8 in FIG. 1) and delete all those:
that involve a number of hypercolors that is strictly less than $\Pi_{q=1:K}C_q$. In this case, not all the combinations are available to display a plurality of images without modifying at least one of the images.
that involve at least one identical hypercolor in two different concordances (step 10 in FIG. 1).

The remaining arrangements now have a number of hypercolors that is greater than or equal to $\Pi_{q=1:K}C_q$. In all these arrangements, sub-groups of hypercolors are sought that, in each illumination and observation mode, systematically belong to the same concordance. If such hypercolors exist, one per sub-group is kept, for example any or that which, for each illumination and observation mode, has the lowest average color difference from the reference color, and the others are saved in the form of secondary hypercolors associated with a concordance for each illumination and observation mode under consideration, within a particular arrangement. Once these hypercolors have been removed, the preceding step of deleting arrangements is reapplied.

Arrangements that have a number of hypercolors that is equal to $\Pi_{q=1:K}C_q$ may allow as many images that are independent of one another to be encoded as there are illumination and observation modes present.

The process may also be carried out in a different way to identify arrangements that are useful for multiplexing by identifying all the hypercolors associated with each of the possible color combinations $C_q$ in K illumination and observation modes and by selecting complete trees of color combinations.

Arrangements found where the number of hypercolors is equal to $\Pi_{q=1:K}C_q$ are referred to as primary arrangements. Arrangements found where the number of hypercolors is greater than $\Pi_{q=1:K}C_q$ are arrangements in which some hypercolors play the same role. All the possible primary arrangements must then be created by keeping only the hypercolors required to obtain a useful arrangement (deletion of redundant hypercolors) in the concordances. The redundant hypercolors are saved in a table of hypercolors known as "reservoirs" and will be used later to define the secondary arrangements that will allow other images to be displayed in other modes, images which are spatially correlated to the primary images.

All the possible primary arrangements are then obtained that allow all the possible ways of multiplexing K images, each having $C_q$ colors to be defined.

Some configurations corresponding to a given number of illumination and observation modes and to particular sets of numbers of concordances per illumination and observation mode do not correspond to any primary arrangement found from the available useful hypercolors, while others on the contrary will have a large number of possible independent arrangements. The best arrangements must therefore be selected from those found for each configuration.

It is worth noting that, to be able to multiplex M independent images out of M modes, a number of hypercolors must be found within each concordance $\Psi_{c,m}$ of the arrangement that is equal to the number of useful hypercolors in the arrangement divided by the number of colors used in a mode m. The number of useful hypercolors meanwhile is equal to the product of the number of colors in the different modes. Concordances that contain identical hypercolors may not be used in the same arrangement.

If a configuration corresponding to a given number of illumination and observation modes and to a particular set of numbers of concordances per illumination and observation mode presents a plurality of possible arrangements, the most relevant must be found from among these (step 12 in FIG. 1).

Primary arrangements will be classified according to the distance (colorimetric distance or other tolerance based on the RGB values captured by a color imager) between the colors of the concordances in each of the modes.

It is also possible to envisage a solution for determining the best possible arrangements for a given number of illumination and observation modes from all the possible combinations of modes and all the possible combinations of colors within these modes, in other words, finding a relevant classification criterion for the solutions found previously, of which are very many when the number of modes chosen from the available modes is small.

Depending on the spatial distribution of colors in the images to multiplex, it is possible that some hypercolors prove unnecessary. It is therefore useful to determine these missing hypercolors in the hyper-image (a stack of images to multiplex according to a three-dimensional table) desired by the user. If there are the unusual hypercolors in the hyper-image, determine the unusual hypercolors in the different arrangements selected and keep only the arrangements that allow the constraints to be eliminated: those for which the unusual hypercolors correspond to the unusual hypercolors in the hyper-image of the user. It can then be considered that a useful arrangement has been produced.

Once a useful arrangement has been selected, the multiplexing of K images (K≤M), to display in K modes from the M available, each containing $C_q$ colors for $1 \leq q \leq K$, and where $C_q$ is ≤ the number of concordances in the mode q, is built by identifying the hypercolor associated with each pixel of the hyper-image (step 14 of FIG. 1).

Note that in a useful arrangement, the set of available hypercolors corresponds to the set of possible combinations of $C_q$ colors.

A possible example of this is the building of a table of hypercolors that allows five two-color images 62, 64, 66, 68 and 70 to be displayed in five different modes, images which can be displayed after building the matrix of hypercolors 72. Image 62 is displayed using illumination and observation mode 1, image 64 is displayed using illumination and observation mode 2, image 66 is displayed using illumination and observation mode 3, image 68 is displayed using illumination and observation mode 4 and image 70 is displayed using illumination and observation mode 5. 32 hypercolors, which can be seen in the table on the left in FIG. 2 (hypercolors 18 to 49), are needed to display the five images 62, 64, 66, 68 and 70. Hypercolors 18 to 49 are suitable for displaying colors 50 to 61 according to illumination and observation modes 1 to 5. Taking the example of mode 1, the hypercolors 18 to 33 display the color 50 and the hypercolors 34 to 49 display the color 51 in the illumination and observation conditions of mode 1. The same reasoning applies to modes 2 to 5 for colors 52 to 61 (for the corresponding hypercolors). The matrix 72 shows the hypercolors used and their position in the security structure in order to obtain the motifs of images 62 to 70 according to illumination and observation modes 1 to 5.

Figure 2:
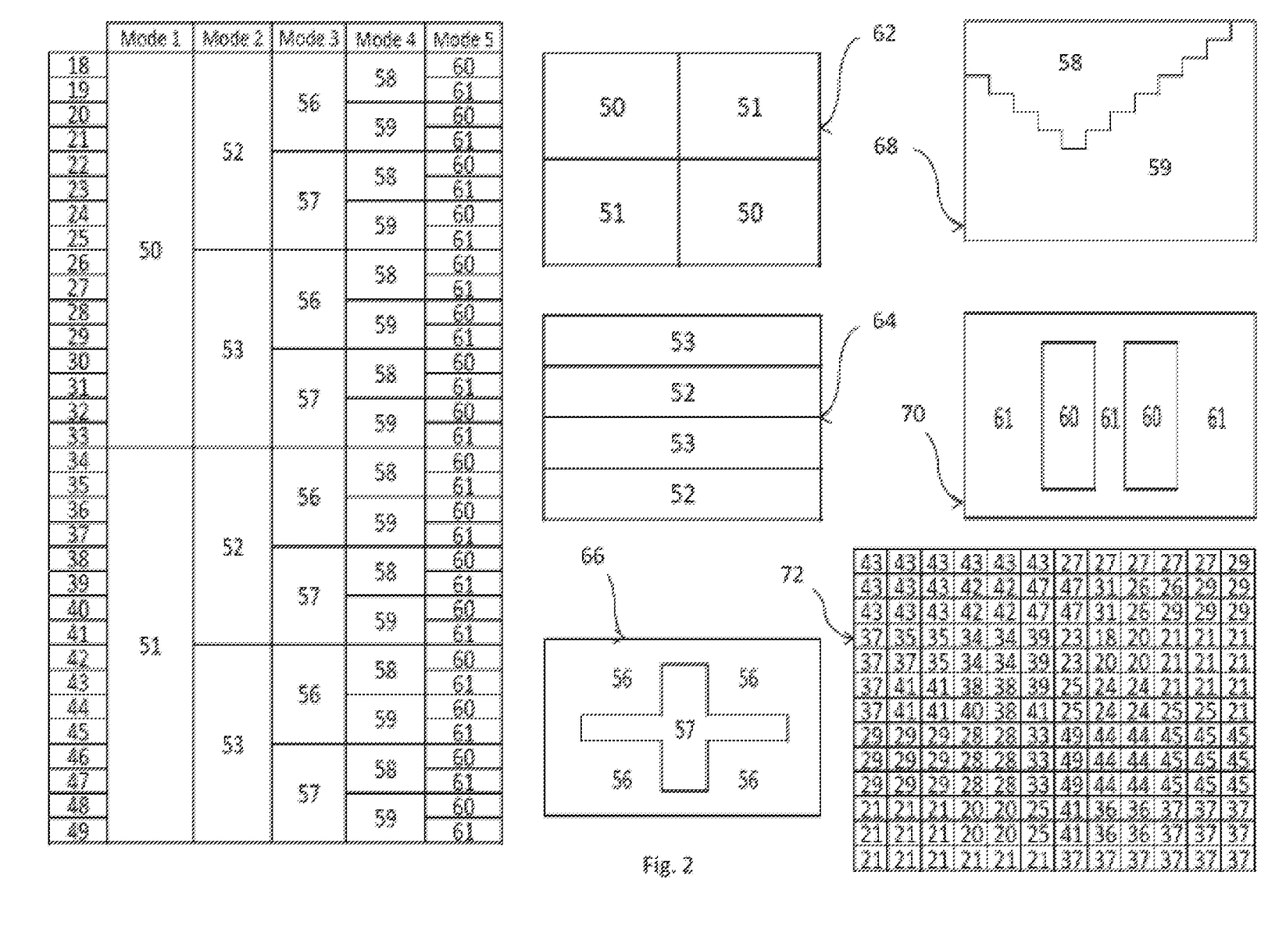
FIG. 2 is an example of a table of color sets each comprising five different colors according to five different illumination and observation modes and five images that can be produced from said table.

It will be noted that in this particular example, because of the shape of images 62 to 70, not all the possible color combinations are present. Consequently, not all the hypercolors are required to display the five images correctly. The hypercolors 19, 22, 23, 30, 32, 33, 46 and 48 from the table on the left of FIG. 2 are not used.

Depending on the marking, deposition or printing technique used, the multiplexing of totally independent images (in other words, in which the colors and shapes in each image may be chosen independently of those in the other images) may be supplemented by secondary images. The number of hypercolors required increases rapidly with the number of images to multiplex and the number of colors used in each of these images (in the previous example, 32 useful hypercolors are needed over 5 useful illumination and observation modes if 5 independent two-color images are to be displayed). If no independent arrangement exists in the technology that has a sufficient number of useful hypercolors to multiplex M images with $C_q$ colors to be displayed in M illumination and observation modes, it is then possible to take one of the largest useful arrangements available and only multiplex K (<M) different images with $C_q$ colors, an arrangement for which "reservoir" hypercolors were saved which will then allow supplementary images to be displayed that are dependent on these K first images (step 16 in FIG. 1).

The first step consists of producing a structuring table for displaying K first images that are different from one another and are described as "priority" images, said images having $C_K$ colors that can be displayed in K different modes. Secondary arrangements can then be made for the reservoir hypercolors by considering two or more modes defined in part in the (M−K) other remaining illumination and observation modes. These reservoir hypercolors become useful for these secondary illumination and observation modes. One of the illumination and observation modes that then becomes useful in this new arrangement must necessarily consider a single concordance for each of the K illumination and observation modes for which the respective color must necessarily be equal to that of the useful hypercolor used with the primary arrangement. The reservoir hypercolors under consideration form a useful arrangement over other modes defined within the (M−K) modes in which the useful hypercolor and the reservoir hypercolors have different colors. This method allows new information to be injected into the area covered by the useful hypercolor under consideration in order to compose the secondary useful arrangement. The images displayed in the new illumination and observation modes, known as "secondary modes," will therefore not be completely independent of the images encoded by the primary useful arrangement.

This operation may be repeated for each reservoir hypercolor of the primary arrangements presented previously. A plurality of illumination and observation modes exist in which the reservoir hypercolors selected according to the secondary arrangements chosen, may display the same image; in this case, not all said modes are useful. To add different secondary images in the useful secondary modes, the reservoir hypercolors may be associated with different useful colors.

Appropriate use of reservoir hypercolors alone does not alter the primary modes as their colors are identical in the useful modes to those already selected to build the initial structuring table (allowing K first images to be displayed that are all different from one another).

Thus, if the addition of a $(K+1)^{th}$ illumination and observation mode to the K first illumination and observation modes is considered, it is possible to insert information on specific areas of the structuring table by adding fragments of a chosen global image, such as a watermark, and referred to as "secondary data."

In addition, it may be noted that for some secondary modes, injectable information may not be possible (no divisible hypercolors in these modes), but the final result obtained will be different from the primary modes.

After determining a matrix of hypercolors, it is possible to parameterize a marking device such as that cited above in order to modify a substrate and create a security element suitable for displaying n multiplexed images visible in n illumination and observation modes.

The invention is not limited to the embodiments presented and other embodiments will be clear to the person skilled in the art. In particular, it is possible to apply the inscription of multiplexed color images to a support for high-density data storage, decorating luxury items, design, etc.

The invention claimed is:

1. A method for building at least one security image for a security structure of a security document from a multiplexing of determined color images, the method comprising:

selecting a marking method capable of producing sets of colors on the security document comprising different colors that can be displayed according to illumination and observation modes of the security structure;

establishing a plurality of color sets based on optical measurement that can be displayed by the security structure in a plurality of the different illumination and observation modes, each color set comprising colors from among the different colors capable of being produced by the marking method;

distributing the color sets in a plurality of groups of color sets;

establishing combinations of groups of color sets having at least one color set in common across a number of the plurality of different illumination and observation modes;

selecting a combination of a group of color sets based on the number of desired illumination and observation modes and a number of colors per color image; and determining the color images to multiplex by means of the combination of the group of color sets selected.

2. The method according to claim 1, wherein determining the color images to multiplex by means of the combination of the group of color sets selected comprises:

building a table of color sets from the combination of the group of color sets selected;

determining the color images to multiplex from the table of color sets; and producing multiplexed color images by means of the table of color sets.

3. The method according to claim 1, wherein a display of different multiplexed color images is independent of any spatial filtering system, and an observed resolution of the color images is the same as that for at least one of marking, deposition, or printing.

4. The method according to claim 1, wherein distributing the color sets comprises at least one of:

determining the color sets comprising colors that can be observed in the same illumination and observation mode for which the difference between said colors is below a given threshold;

creating new color sets; and determining color sets comprising colors that are identical in the same illumination and observation modes.

5. The method according to claim 4, wherein determining the color sets comprising colors that can be observed in the same illumination and observation modes for which the difference between said colors is below a given threshold comprises an iteration of the following:

determining a reference color present in a first color set and in a given illumination and observation mode;

comparing the reference color and a second color from a second color set, the second color being observable in the same illumination and observation mode as the reference color; and adding the second color to the color set associated with the reference color for the selected illumination and observation mode if the difference between the two colors is below the given threshold.

6. The method according to claim 1 comprising, following distributing the color sets in a plurality of groups of color sets, selecting the groups of color sets that do not comprise, in each illumination and observation mode, any color set in common.

7. The method according to claim 6, wherein selecting the groups of color sets is carried out by iteration of the following:

selecting the group of color sets having a largest number of color sets for each illumination and observation mode; and eliminating all the groups of color sets having color sets that are already present in the group having the largest number of color sets.

8. The method according to claim 6, wherein establishing combinations of groups of color sets having at least one color set in common is carried out with respect to each selection of a group of color sets selected through all the illumination and observation modes.

9. The method according to claim 8, wherein establishing a combination of groups of color sets having at least one color set in common comprises:

determining all the combinations of groups of color sets that exist among the groups of color sets from all the possible selections of groups of color sets; and eliminating, for each illumination and observation mode, combinations of groups of color sets that involve a number of color sets that is strictly less than $\Pi_{q=1:K-1}C_q$, wherein $C_q$ is a number of groups of color sets for an illumination and observation mode q, and K−1 is a complete set of illumination and observation modes except for the illumination and observation mode in question.

10. The method according to claim 9 comprising, for the combinations of groups of color sets involving a number of color sets that is strictly greater than $\Pi_{q=1:K-1}C_q$, the following:

searching for sub-groups of color sets that belong to the same group of color sets in each illumination and observation mode;

selecting a sub-group with the lowest average color difference from the reference color for each illumination and observation mode; and saving the other sub-groups of color sets.

11. The method according to claim 1, wherein the marking method is laser structuring of a layer of the security document comprising metal nanoparticles.

12. The method according to claim 1, further comprising marking the security structure using the selected marking method to produce the multiplexing of the determined color images.

13. A method for building at least one security image for a security structure of a security document from a multiplexing of determined color images, the method comprising:

establishing a plurality of color sets based on optical measurement that can be displayed by the security structure in a plurality of different illumination and observation modes, each color set comprising colors from among different colors capable of being produced on the security document by a marking method in the different illumination and observation modes;

distributing the color sets in a plurality of groups of color sets;

establishing combinations of groups of color sets having at least one color set in common across a number of the plurality of different illumination and observation modes;

selecting a combination of a group of color sets based on the number of desired illumination and observation modes and a number of colors per color image; and determining the color images to multiplex by means of the combination of the group of color sets selected.

14. The method according to claim 13, wherein determining the color images to multiplex by means of the combination of the group of color sets selected comprises:

building a table of color sets from the combination of the group of color sets selected;

determining the color images to multiplex from the table of color sets; and producing multiplexed color images by means of the table of color sets.

15. The method according to claim 13, wherein distributing the color sets comprises at least one of:

determining the color sets comprising colors that can be observed in the same illumination and observation mode for which the difference between said colors is below a given threshold;

creating new color sets; and determining color sets comprising colors that are identical in the same illumination and observation modes.

16. The method according to claim 15, wherein determining the color sets comprising colors that can be observed in the same illumination and observation modes for which the difference between said colors is below a given threshold comprises an iteration of the following:

determining a reference color present in a first color set and in a given illumination and observation mode;

comparing the reference color and a second color from a second color set, the second color being observable in the same illumination and observation mode as the reference color; and adding the second color to the color set associated with the reference color for the selected illumination and observation mode if the difference between the two colors is below the given threshold.

17. The method according to claim 13 comprising:

following distributing the color sets in a plurality of groups of color sets, selecting the groups of color sets that do not comprise, in each illumination and observation mode, any color set in common;

wherein selecting the groups of color sets is carried out by iteration of the following:

selecting the group of color sets having a largest number of color sets for each illumination and observation mode; and eliminating all the groups of color sets having color sets that are already present in the group having the largest number of color sets.

18. The method according to claim 13, wherein establishing a combination of groups of color sets having at least one color set in common comprises:

determining all the combinations of groups of color sets that exist among the groups of color sets; and eliminating, for each illumination and observation mode, combinations of groups of color sets that involve a number of color sets that is strictly less than $\Pi_{q=1:K-1}C_q$, wherein $C_q$ is a number of groups of color sets for an illumination and observation mode q, and K−1 is a complete set of illumination and observation modes except for the illumination and observation mode in question.

19. The method according to claim 18 comprising, for the combinations of groups of color sets involving a number of color sets that is strictly greater than $\Pi_{q=1:K-1}C_q$, the following:

searching for sub-groups of color sets that belong to the same group of color sets in each illumination and observation mode;

selecting a sub-group with the lowest average color difference from the reference color for each illumination and observation mode; and saving the other sub-groups of color sets.

20. The method according to claim 13, wherein the marking method is laser structuring of a layer of the security document comprising metal nanoparticles and further comprising marking the security structure using the marking method to produce the multiplexing of the determined color images.

* * * * *